United States Patent [19]
Wilkinson

[11] Patent Number: 4,873,602
[45] Date of Patent: Oct. 10, 1989

[54] RIPPLE ATTENUATOR FOR AC POWER TRANSMISSION LINE PROTECTIVE RELAYS

[75] Inventor: Stanley B. Wilkinson, Havertown, Pa.

[73] Assignee: General Electric Company, Malvern, Pa.

[21] Appl. No.: 120,079

[22] Filed: Nov. 12, 1987

[51] Int. Cl.[4] .............................................. H02H 3/16
[52] U.S. Cl. ......................................... 361/78; 361/87
[58] Field of Search .................. 361/63, 78, 80, 87, 361/86, 84, 36, 35, 76, 82, 81; 333/210, 248

[56] References Cited

U.S. PATENT DOCUMENTS

| | | | |
|---|---|---|---|
| 2,863,100 | 12/1958 | Rice | 361/63 |
| 3,579,040 | 5/1971 | Tenenbaum | 361/78 |
| 4,034,269 | 7/1977 | Wilkinson | 361/80 X |
| 4,079,435 | 3/1978 | Zaslavskaya et al. | 361/82 |
| 4,204,237 | 5/1980 | Zocholl | 361/87 X |
| 4,210,948 | 7/1980 | Waltz | 361/76 |
| 4,234,842 | 11/1980 | Brennen et al. | 323/210 |
| 4,402,028 | 8/1983 | Udren | 361/87 X |
| 4,420,788 | 12/1983 | Wilkinson et al. | 361/80 X |
| 4,453,191 | 6/1984 | Wilkinson | 361/84 |
| 4,477,854 | 10/1984 | Usui et al. | 361/87 X |
| 4,607,309 | 8/1986 | Bishop | 361/63 X |
| 4,669,024 | 5/1987 | Stacey | 361/85 |
| 4,675,631 | 6/1987 | Waggett | 333/210 |
| 4,723,189 | 2/1988 | Larsen et al. | 361/76 |

Primary Examiner—A. D. Pellinen
Assistant Examiner—A. Jonathan Wysocki
Attorney, Agent, or Firm—Henry J. Policinski; William H. Murray

[57] ABSTRACT

A circuit for preventing the generation of an erroneous output signal from a protective relay for detecting faults in a three phase alternating current electrical power distribution system, which relay uses a full wave rectified signal as an operate quantity. The circuit includes a band pass filter having an input adapted to receive the full wave rectified signal; a center frequency which is tuned to the frequency of at least one principal harmonic component of the full wave rectified signal; a gain substantially equal to $-1$; and an output. A two-input summing amplifier has one input which is adapted to receive the full wave rectified signal and the other input which is connected to the output of the band pass filter. In the preferred embodiment, the circuit removes the second harmonic component of the full wave rectified signal thereby preventing the relay from generating a faulty trip signal for those faults beyond the reach of the relay which, but for the elimination of the increase in the magnitude of the DC level of the operate signal due to the contribution of the second harmonic component, would cause the relay to operate.

14 Claims, 3 Drawing Sheets

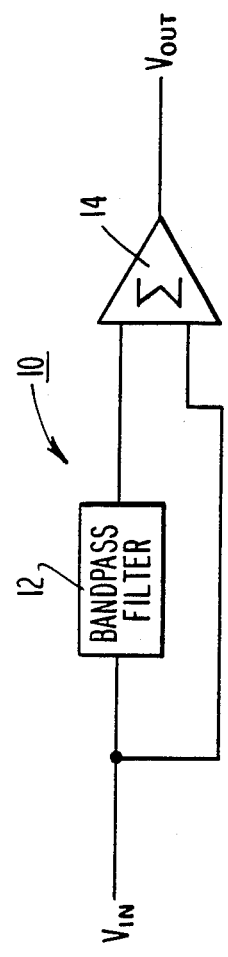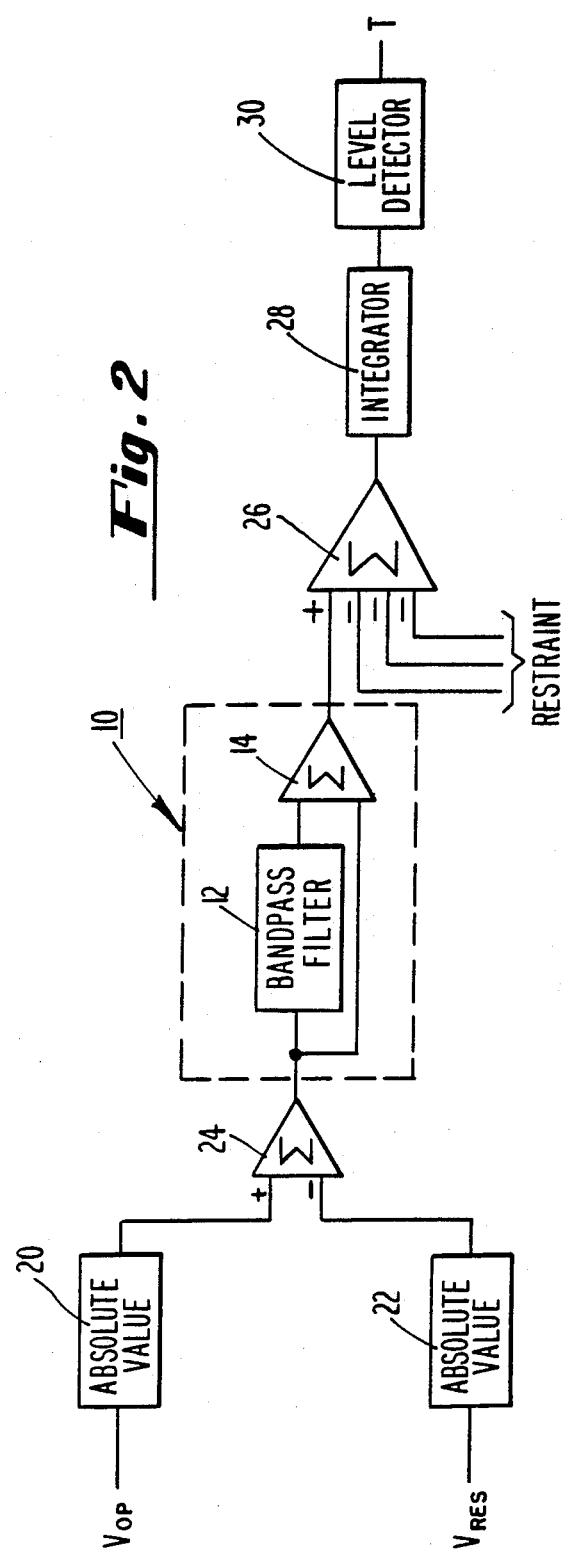

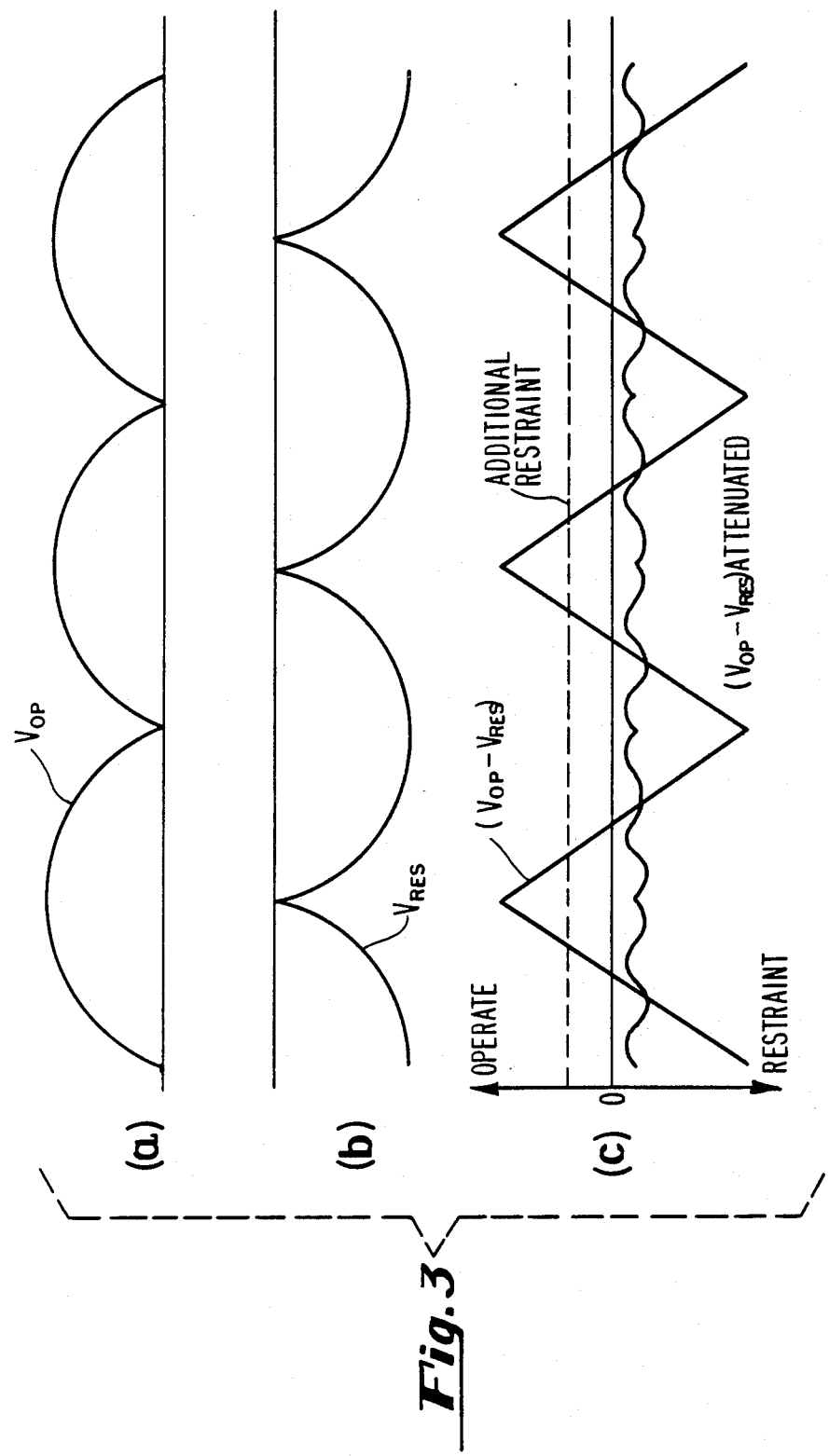

RIPPLE ATTENUATOR FOR AC POWER TRANSMISSION LINE PROTECTIVE RELAYS

BACKGROUND OF THE INVENTION

The present invention relates to protective relays for use in AC electrical power distribution systems and more particularly to distance relays for detecting faults within a protected zone of an AC power transmission line.

Distance relays are well known in the art of protective relaying. For example, reference may be had to "The Art and Science of Protective Relaying", Mason, published by John Wiley & Son, Inc. (1956), particularly to chapter 14. Phase distance relays are utilized in protective systems for AC power transmission lines to detect phase faults or phase to phase to ground faults within a protected zone or portion of the transmission line. Phase distance relays are utilized to detect faults involving more than one electrical phase and if such a fault is detected within the zone or reach of the relay, the phase relay will generate a signal which will cause the operation of a three pole circuit breaker to trip all three phases of the transmission line.

As indicated above, each particular phase relay should only detect faults within its protected zone or reach. The parameters of a phase relay are commonly selected to correspond to the parameters of the transmission line. For example, the parameters are selected to provide a forward reach that may correspond to the forward distance of the zone of the transmission line under the protection of the particular relay. It is desired that the phase relay operate within its selected forward reach and thereby confining the protection of a particular phase relay to a selected zone within the protected system.

The desired operation of a phase relay may be hindered by the inability of the relay to distinguish between internal and external faults. In some cases, this inability is characterized as "overreaching" of the relay. Overreaching is that condition where the relay detects a fault which occurs beyond the end of the protected zone and generates a signal as if that fault had occurred within the protected zone.

In distance relays utilizing energy comparison, a circuit breaker trip signal is generated when the output signal of an operational amplifier, having a feedback circuit comprising a resistor and a capacitor connected in parallel, and an input signal, which is related to the magnitude of an operate signal minus the magnitude of one or more restraint signals, exceeds a predetermined level. Such an energy comparison circuit in a relay is disclosed in my co-pending U.S. patent application Ser. No. 120,078 entitled "Negative and Zero Sequence Directional Overcurrent Unit for AC Power Transmission Line Protection", Ser. No. 120,078, which application is filed concurrently herewith; which is assigned to the same assignee as the present application; and which is incorporated into this detailed description as if fully set forth herein. In this type of protective relay, the operate signal is a full wave rectified AC signal which, along with a full wave rectified AC and other DC restraint signals, are applied to the inputs of a summing amplifier. The restraint signals have a polarity which is opposite to that of the operate signal; therefore, the output of the summing amplifier is a signal which has a magnitude substantially equal to the algebraic sum of the operate and restraint signals.

The rectified sine wave which comprises the operate signal is primarily a DC signal with harmonics of the fundamental frequency of the full wave rectified AC signal, where the second harmonic is much larger than the other harmonics. The harmonics of the fundamental, and principally the second harmonic, make a substantial contribution to the magnitude of the instantaneous level of the operate signal. When the magnitude of the instantaneous level of the operate signal is larger than it should be as a result of the actual fault conditions, the difference between the operate and restraint signals will also be larger thereby resulting in a larger signal applied to the integrator/level detector combination. As a result, an additional contribution to the magnitude of the operate signal due to harmonics of the fundamental frequency can cause the erroneous generation of an output signal from the level detector. This results in reduced security of the system because the relay is generating a trip signal for faults which occur outside of its predetermined reach.

Accordingly, it is an object of the present invention to provide improved discrimination between internal and external faults thereby increasing the reliability of relay operation and the security of the protection system.

Another object of the present invention is to minimize "overreaching" of distance relays in a protective system for AC power transmission lines.

It is still another object of the present invention to minimize erroneous operation of distance relays due to spurious signals which increase the magnitude of the operate signal in the relay.

These and other objects of the present invention will become apparent to those skilled in the art upon consideration of the following description of the invention.

SUMMARY OF THE INVENTION

The present invention comprises means for removing the principal harmonic component of a full wave rectified signal in a distance relay which utilizes the magnitude of the full wave rectified signal as an operate quantity. The preferred embodiment of the invention comprises a band pass filter having a center frequency which is substantially equal to the frequency of the second harmonic of the fundamental frequency of the full wave rectified signal. The gain of the band pass filter is preferably equal to $-1$. The full wave rectified signal is coupled to the input of the band pass filter and one input of a two-input summing amplifier. The output of the band pass filter, which is substantially equal to the inverse of the second harmonic of the full wave rectified input signal, is coupled to the second input of the two-input summing amplifier. Since the output of the two-input summing amplifier is equal to the algebraic sum of the input signals, the output of the summing amplifier is substantially equal to the full wave rectified signal minus the second harmonic component. This output, with the second harmonic removed, is utilized as the net operate signal in the distance relay. Removal of the second harmonic component prevents the relay from generating a faulty trip signal for those faults beyond the reach of the relay which, but for the elimination of the increase in the magnitude of the DC level of the operate signal due to the contribution of the second harmonic component, would cause the relay to operate.

DETAILED DESCRIPTION OF THE DRAWINGS

While the specification includes claims particularly pointing out and distinctly claiming that which is regarded as the present invention, the object and advantages of this invention can be more readily ascertained from the following description of a preferred embodiment when read in conjunction with the accompanying drawings in which:

FIG. 1 is a block diagram of a preferred embodiment of a ripple attentuator accordance with the present invention.

FIG. 2 is a block diagram of a portion of a distance relay which incorporates the ripple attenuator depicted in FIG. 1.

FIG. 3 depicts exemplary waveforms for an operate signal $V_{OP}$, a restraint signal $V_{RES}$ and a resultant net signal ($V_{OP} - V_{RES}$), with and without ripple attenuation in accordance with the present invention for the case where $V_{RES}$ is 90° out of phase with $V_{OP}$ and has a peak magnitude which is greater than the peak magnitude of $V_{OP}$.

DETAILED DESCRIPTION OF THE PREFERRED EMBODIMENT

Figure 4:
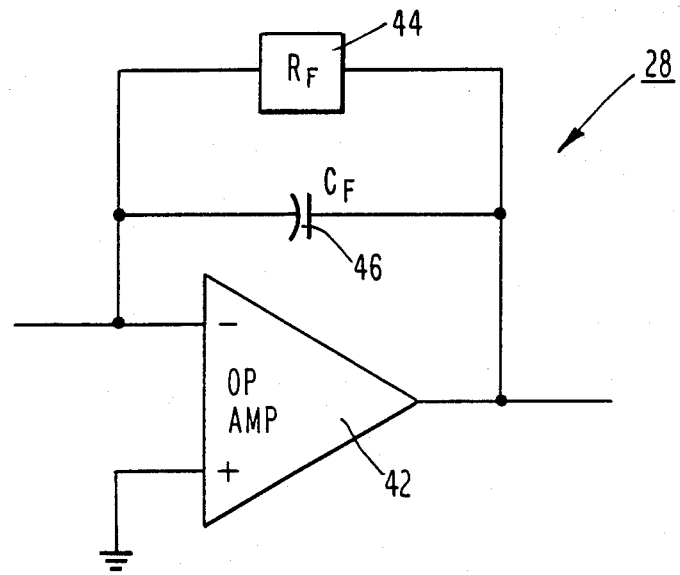
FIG. 4 is a block diagram of a preferred embodiment of an integrator circuit.

Referring now to FIG. 1, there is shown a block diagram of a preferred embodiment of a ripple attenuator in accordance with the present invention, generally designated 10. The ripple attenuator 10 comprises a band pass filter 12 having a center frequency which is tuned to the second harmonic of the system frequency, typically 60 Hz or 50 Hz. The band pass filter 12 preferably has a Q of two and a gain of $-1$. The input of the band pass filter 12, which is adapted to receive full wave rectified AC signals having a fundamental frequency which is equal to the system frequency, typically 60 Hz or 50Hz, is connected to one input of a first two-input summing amplifier 14.

The output of the band pass filter 12, which is substantially equal to the inverse of the second harmonic component of the fundamental frequency of the full wave rectified input signal, is coupled to the second input of the first two-input summing amplifier 14. The output of the first two-input summing amplifier 14 is a signal having a magnitude which is substantially equal to the algebraic sum of the input signals. Since the input signals are the full wave rectified signals and the inverse of the second harmonic component of those signals, the output of the two-input summing amplifier is substantially equal to the full wave rectified signal with the second harmonic component removed.

Referring now to FIG. 2, there is shown a portion of a distance relay utilizing the ripple attenuator 10 depicted in FIG. 1 described above. As can be seen from FIG. 2, an AC operate signal $V_{OP}$, having a fundamental frequency equal to the system frequency, typically 60 Hz or 50 Hz, is coupled to the input of a first absolute value circuit 20. As is known to those skilled in the art, the operate signal $V_{OP}$ can be, for example, a signal with ($V_2 - I_2 Z$) which is related to the difference between the negative sequence voltage $V_2$ and the signal $I_2 Z$ which is related to the negative sequence current. The first absolute value circuit 20 comprises a full wave precision rectifier, the output of which is substantially equal to the full wave rectified AC input signal.

An AC restraint signal $V_{RES}$, also having a fundamental frequency equal to the system frequency, is coupled to the input of a second absolute value circuit 22. As is known to those skilled in the art of protective relaying, the restraint signal $V_{RES}$ can be, for example, a signal ($V_1 - I_1 Z$) which is related to the difference between the positive sequence voltage $V_1$ and the signal $I_1 Z$ which is related to the positive sequence current. The second absolute value circuit 22, comprises a full wave precision rectifier, the output of which is substantially equal to the full wave rectified AC input signal.

The output of the first absolute value circuit 20 is coupled to a non-inverting input of a second two-input summing amplifier 24. In the preferred embodiment, the second two-input summing amplifier 24 is an operational amplifier whose output is equal to the sum of the inverting and non-inverting inputs. The output of the second absolute value circuit 22 is coupled to the inverting input of the second two-input summing amplifier 24. The output of the second two-input summing amplifier 24, which is the net operate signal ($V_{OP} - V_{RES}$) is coupled to the input of the band pass filter 12 of the ripple attenuator 10 and one input of the first two-input summing amplifier 14 of the ripple attenuator. The output of the band pass filter 12 is coupled to the second input of the first two-input summing amplifier 14 as previously described. The output of the first two-input summing amplifier 14, which as previously described is the full wave rectified net operate signal with the second harmonic component removed, is coupled to a non-inverting input of a multi-input summing amplifier 26. One or more restraint signals are applied to inverting inputs of the multi-input summing amplifier 26. The magnitude of the output signal from the multi-input summing amplifier 26 is the algebraic sum of the magnitudes of the input signals.

The output of the summing amplifier 26 is coupled to the input of an "integrator" circuit 28. As shown in FIG. 4, the "integrator" circuit 28 is preferably an operational amplifier 42 having a feedback circuit connected between its output and its input. The feedback circuit comprises a resistor 44 and a capacitor 46 connected in parallel. The input to the "integrator" circuit 28 is the input to the operational amplifier; and the output of the "integrator" circuit 28 is the output of the operational amplifier. The output of the "integrator" circuit 28 is applied to the input of a level detector 30. The output of the level detector 30, which appears when the input exceeds a predetermined level which is established to provide a threshold to overcome extraneous signals, is a signal T which is utilized by the relay system to direct a trip signal to the pole of a circuit breaker for disconnecting one or more phases of the protected zone of the transmission line from the rest of the transmission system.

The ripple attenuator improves the security of the protective relay system in which it is utilized by preventing overreaching of the distance relay as follows. FIG. 3 depicts phase and magnitude relationships of an operate signal $V_{OP}$ and a restraint signal $V_{RES}$. As is known to those skilled in the art of protective relay systems, for a fault on the system the $V_{OP}$ and $V_{RES}$ signals can have an out of phase relationship depending on the type of fault occurring. For illustration purposes, a 90° phase relationship is depicted in FIGS. 3(a) and 3(b). However, when, as is depicted in FIG. 3(a) and (b), the peak magnitude of the $V_{RES}$ signal exceeds the peak magnitude of the $V_{OP}$ signal, the fault has occurred outside of the protected zone.

With the $V_{OP}$ and $V_{RES}$ signals 90° out-of-phase and the peak magnitude of the $V_{RES}$ signal slightly greater than the peak magnitude of the $V_{OP}$ signal as shown in FIG. 3(a) and (b), the instantaneous value of the net operate signal ($V_{OP}-V_{RES}$) can lie well within the operate zone as shown in FIG. 3(c) even with the application of additional restraint signals to the multi-input summing amplifier 26, which addition is represented by the dotted line. Since the fault has occurred outside of the protected zone, it is not desirable that the relay operate. One way to prevent operation of the relay, when the instantaneous magnitude of the net operate signal ($V_{OP}-V_{RES}$) falls within the operate zone as shown in FIG. 3(c), is to increase the time constant of the relay. This, however, is not desirable since the result will be a very slow operating relay.

This problem is solved in accordance with the present invention by subtracting the principal harmonic component of the net operate signal ($V_{OP}-V_{RES}$) from the net operate signal ($V_{OP}-V_{RES}$) itself. As can be seen from FIG. 3(c), the principal component of the net operate signal ($V_{OP}-V_{RES}$) in this example is the second harmonic component which causes the instantaneous magnitude of the net operate signal to exceed the restraints. The curve, labeled ($V_{OP}-V_{RES}$) ATTENUATED, depicts the net operate signal ($V_{OP}-V_{RES}$) with the second harmonic component removed. As can be seen in FIG. 3(c), the instantaneous magnitudes of the ($V_{OP}-V_{RES}$) ATTENUATED signal lie within the restraint portion, with the additional restraints indicated by the dotted line providing an additional band of restraint margin.

As can be seen from the above description, the ripple attenuator of the present invention increases the security of the protective relay system by preventing overreaching of the distance relay. With the ripple attenuator of the present invention added to the protective relay to remove the second harmonic component, a much lower time constant in the integrator is permissible without fear of overreaching. It should be noted that if the fourth and/or higher harmonic components of the fundamental frequency are of such magnitude that one or more contributes to the erroneous operation of the relay, each such harmonic may be removed by the addition of a second ripple attenuator, having a center frequency tuned to that particular harmonic frequency, and which is connected in series with the second harmonic ripple attenuator. Such additions are considered to be within the scope and contemplation of my invention.

Figure 5:
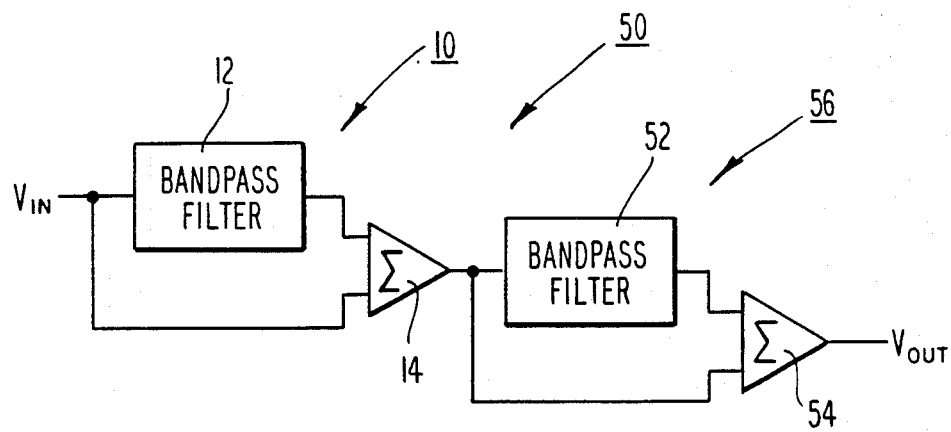
FIG. 5 is a block diagram of an alternate preferred embodiment of a ripple attenuator in accordance with the present invention.

Referring to FIG. 5, there is shown a block diagram of an alternate preferred embodiment of a ripple attenuator in accordance with the present invention for removing the fourth harmonic component as well as the second harmonic component, generally designated 50. The ripple attenuator 50 comprises a first ripple attenuator 10 for removing the second harmonic component in accordance with the ripple attenuator 10 previously described with respect to FIG. 1. The output of the two-input summing amplifier 14 of the first ripple attenuator 10 is coupled to the input of a second band pass filter 52 and one input of a second two-input summing amplifier 54 of a second ripple attenuator generally designated 56. The second ripple attenuator 56 is substantially the same as the first ripple attenuator except that the second band pass filter 52 has a center frequency which is tuned to the fourth harmonic of the system frequency. The second band pass filter 52 preferably has a Q of two and a gain of $-1$.

The output of the second band pass filter 52, which is substantially equal to the inverse of the fourth harmonic component of the fundamental frequency of the full wave rectified input signal, is coupled to the second input of the second two-input summing amplifier 54. The output of the second two-input summing amplifier 54 is a signal having a magnitude which is substantially equal to the algebraic sum of the input signal. Since the input signals are the full wave rectified signal with the second harmonic component removed and the inverse of the fourth harmonic component of that signal, the output of the second two-input summing amplifier 54 is substantially equal to the full wave rectified signal with the second and fourth harmonic components removed.

While the present invention has been described with reference to a specific embodiment thereof, it will be obvious to those skilled in the art that various changes and modifications may be made without departing from the invention in its broader aspects. It is contemplated in the appended claims to cover all variations and modifications of the invention to come within the true spirit and scope of my invention.

What is claimed is:

1. A protective relay for detecting faults in a three phase alternating current electrical power distribution system, said relay comprising:
   (a) means for generating an alternating current operate signal;
   (b) means for rectifying said alternating current operate signal;
   (c) means for removing at least one principal harmonic component from said rectified alternating current operate signal; and
   (d) energy comparison means, connected to receive said rectified alternating current operate signal with said at least one principal harmonic component removed, for generating a relay output signal as a function of the magnitude of the received operate signal.

2. The protective relay in accordance with claim 1 wherein said means for removing said at least one principal harmonic component comprises:
   (a) band pass filter means having an input connected to receive said rectified alternating current operate signal, a center frequency of which is tuned to the frequency of said at least one principal harmonic component, a gain substantially equal to $-1$, and an output; and
   (b) a two-input summing amplifier, one input of which is connected to receive said rectified alternating current operate signal and the other input of which is connected to the output of the band pass filter means.

3. The protective relay in accordance with claim 2 wherein said means for rectifying said alternating current operate signal comprises a full-wave rectifier.

4. The protective relay in accordance with claim 3 wherein said energy comparison means comprises:
   (a) integrator circuit means comprising an operational amplifier having an input connected to receive said net operate signal, an output, and a feedback circuit connected between said input and said output, said feedback circuit comprising resistance means and capacitance means electrically connected in parallel; and (b) level detector means for generating said relay output signal when the magnitude of an output signal from the output of said operational amplifier exceeds a predetermined level.

5. The protective relay in accordance with claim 4 additionally comprising:
   (a) means for generating an alternating current restraint signal;
   (b) means for full-wave rectifying said alternating current restraint signal;
   (c) means for generating a net operate signal which is substantially equal to the sum of said rectified alternating current operate signal and said rectified alternating current restraint signal;
wherein said harmonic component removal means removes at least one principal harmonic component from said net operate signal, and said energy comparison means is connected to receive said net operate signal with said at least one principal harmonic component removed and generate a relay output signal as a function of the magnitude of the received net operate signal.

6. The protective relay in accordance with claim 5 additionally comprising:
   (a) at least one additional restraint signal; and
   (b) means for generating a second net operate signal which is substantially equal to the sum of said net operate signal with said at least one principal harmonic component removed and said at least one additional restraint signal;
wherein said energy comparison means is connected to receive said second net operate signal and generate a relay output signal as a function of the magnitude of the received second net operate signal.

7. The protective relay in accordance with claim 6 wherein said at least one principal harmonic component removed comprises the second harmonic component.

8. The protective relay in accordance with claim 7 wherein said means for removing said at least one principal harmonic component comprises:
   (a) a first band pass filter means having an input connected to receive said net operate signal, a center frequency which is tuned to the frequency of the second harmonic component, a gain substantially equal to $-1$, and an output; and
   (b) a first two-input summing amplifier for generating an output signal having a magnitude which is substantially equal to the sum of the magnitude of signals applied to the two inputs, one input of which is connected to receive said net operate signal and the other input of which is connected to the output of the first band pass filter means.

9. The protective relay in accordance with claim 8 wherein said at least one principal harmonic component removed additionally comprises the fourth harmonic component.

10. The protective relay in accordance with claim 9 wherein said means for removing said at least one principal harmonic component additionally comprises:
    (a) a second band pass filter means having an input adapted to receive the output signal from said first two-input summing amplifier, a center frequency which is tuned to the frequency of said fourth harmonic component, a gain substantially equal to $-1$, and an output; and
    (b) a second two-input summing amplifier, for generating an output signal having a magnitude which is substantially equal to the algebraic sum of the magnitude of signals applied to the two inputs, one input of which is connected to receive said output signal from said first two input summing amplifier and the other output of which is connected to the output of the second band pass filter means.

11. A protective relay for detecting faults in a three phase alternating current electrical power distribution system, said relay comprising:
    (a) means for generating an alternating current operate signal related to a sequence component of a power system voltage and a sequence component of a power system current;
    (b) means for generating an alternating current restraint signal related to a sequence component of a power system voltage and a sequence component of a power system current;
    (c) means for rectifying said alternating current operate signal;
    (d) means for rectifying said alternating current restraint signal;
    (e) means for generating a net operate signal which is substantially equal to the sum of said rectified alternating current operate signal and said rectified alternating current restraint signal;
    (f) means for removing at least one principal harmonic component from said rectified net operate signal;
    (g) means for generating at least one additional restraint signal;
    (h) means for generating a second net operate signal which is substantially equal to the sum of the magnitude of said net operate signal with said at least one principal harmonic component removed, and the magnitude of said at least one additional restraint signal;
    (i) integrator circuit means comprising an operational amplifier having an input connected to receive said second net operate signal, an output, and a feedback circuit connected between said input and said output, said feedback circuit comprising resistance means and capacitance means electrically connected in parallel; and
    (j) level detector means for generating a relay output signal when the magnitude of an output signal from the output of the operational amplifier exceeds a predetermined level.

12. The protective relay in accordance with claim 11 wherein said alternating current operate signal is related to a negative sequence component of the power system voltage and a negative sequence component of the power system current, and said alternating current restraint signal is related to a positive sequence component of the power system voltage and a positive sequence component of the power system current.

13. The protective relay in accordance with claim 12 wherein said at least one principal harmonic component removed comprises the second harmonic component.

14. The protective relay in accordance with claim 13 wherein said means for removing said second harmonic component comprises:
    (a) band pass filter means having an input adapted to receive said net operate signal, a center frequency which is tuned to the frequency of the second harmonic component, a gain substantially equal to $-1$, and an output; and
    (b) a two-input summing amplifier for generating an output signal having a magnitude which is substantially equal to the sum of the magnitude of the signals applied to the two inputs, one input of which is connected to receive said net operate signal and the other input of which is connected to the output of the band pass filter means.

* * * * *